United States Patent
Zhao et al.

(10) Patent No.: US 11,599,774 B2
(45) Date of Patent: Mar. 7, 2023

(54) TRAINING MACHINE LEARNING MODEL

(71) Applicant: International Business Machines Corporation, Armonk, NY (US)

(72) Inventors: Shiwan Zhao, Beijing (CN); Bing Zhe Wu, Beijing (CN); Zhong Su, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 944 days.

(21) Appl. No.: 16/369,135

(22) Filed: Mar. 29, 2019

(65) Prior Publication Data
US 2020/0311520 A1 Oct. 1, 2020

(51) Int. Cl.
| | | |
|---|---|---|
| G06T 7/00 | (2017.01) | |
| G06F 17/18 | (2006.01) | |
| G06K 9/62 | (2022.01) | |
| G06N 3/04 | (2023.01) | |
| G06N 20/00 | (2019.01) | |

(52) U.S. Cl.
CPC ........... *G06N 3/0472* (2013.01); *G06F 17/18* (2013.01); *G06K 9/6256* (2013.01); *G06N 20/00* (2019.01); *G06T 7/0012* (2013.01); *G06T 2207/20081* (2013.01); *G06T 2207/20084* (2013.01)

(58) Field of Classification Search
CPC ..... G06K 9/6256; G06T 7/0012; G06F 17/18; G06N 20/00; G06N 3/0472
See application file for complete search history.

(56) References Cited

U.S. PATENT DOCUMENTS

| | | | |
|---|---|---|---|
| 10,388,272 B1* | 8/2019 | Thomson | G10L 15/22 |
| 10,719,301 B1* | 7/2020 | Dasgupta | G06K 9/6267 |
| 11,017,322 B1* | 5/2021 | Du | H04L 67/10 |
| 2016/0275413 A1* | 9/2016 | Shi | G06N 20/00 |
| 2017/0124152 A1 | 5/2017 | Nerurkar et al. | |
| 2017/0199961 A1* | 7/2017 | Yelensky | A61P 35/02 |
| 2019/0303720 A1* | 10/2019 | Karam | G06K 9/624 |
| 2020/0034998 A1* | 1/2020 | Schlemper | G06V 10/768 |
| 2020/0105377 A1* | 4/2020 | Bulik-Sullivan | G01N 33/68 |
| 2020/0234082 A1* | 7/2020 | Toda | G06K 9/6257 |
| 2020/0363414 A1* | 11/2020 | Yelensky | C12N 5/0636 |
| 2020/0364624 A1* | 11/2020 | Kearney | G16H 50/20 |
| 2021/0042811 A1* | 2/2021 | Lancewicki | G06N 3/0454 |
| 2021/0216902 A1* | 7/2021 | Sutcher-Shepard | G06N 20/00 |
| 2022/0012815 A1* | 1/2022 | Kearney | A61B 5/7267 |
| 2022/0180447 A1* | 6/2022 | Kearney | A61B 6/14 |

OTHER PUBLICATIONS

Wu, X. et al. "Bolt-on Differential Privacy for Scalable Stochastic Gradient Descent-based Analytics" SIGMOD, May 14-19, 2017, pp. 1-16.*

(Continued)

*Primary Examiner* — Mia M Thomas
(74) *Attorney, Agent, or Firm* — Patterson + Sheridan, LLP

(57) ABSTRACT

Techniques are provided for training machine learning model. According to one aspect, a training data is received by one or more processing units. The machine learning model is trained based on the training data, wherein the training comprises: optimizing the machine learning model based on stochastic gradient descent (SGD) by adding a dynamic noise to a gradient of a model parameter of the machine learning model calculated by the SGD.

20 Claims, 5 Drawing Sheets

(56) References Cited

OTHER PUBLICATIONS

Richeng Jin, "Decentralized Differentially Private Without-Replacement Stochastic Gradient Descent," arXiv:1809.027272 [cs.LG] Sep. 12, 2018, 16 pages.
Shuang Song, "Stochastic gradient descent with differentially private updates," 4 pages.
Aravindh Mahendran and Andrea Vedaldi, "Understanding Deep Image Representations by Inverting Them," IEEE Xplore, 9 pages.
McMahan et al, "Learning Differentially Private Recurrent Language Models," Published as a conference paper at ICLR 2018, 14 pages.
Anonymous, "Differentially Private Federated Learning: a Client Level Perspective," 9 pages.

* cited by examiner

| DYNAMIC | $\Omega_z$ | TESTING | $\epsilon$ |
|---|---|---|---|
| ✓ | {3.0, 1.0} | 95.23 | 6.97 |
| ✓ | {2.0, 1.0} | 94.31 | 7.10 |
| ✓ | {3.0, 2.0} | 93.57 | 4.97 |
| ✗ | {1.0} | 94.38 | 8.48 |
| ✗ | {2.0} | 93.24 | 5.13 |
| ✗ | {3.0} | 92.15 | 4.70 |

TRAINING MACHINE LEARNING MODEL

BACKGROUND

The present invention relates to data processing, and more specifically, to a method, a system and a program product for training a machine learning model.

Recently, machine learning technology has achieved great success for data analysis, particularly for the technology of convolutional neural network (CNN) and recurrent neural network (RNN). However, due to the limited number of labeled data, the privacy leakage still is a big challenge to be addressed: the model trained using a conventional method may involuntarily reveal the private information of the training data. Where the size of the data is smaller, the privacy leakage is worse.

SUMMARY

This summary is provided to introduce a selection of concepts in a simplified form that are further described herein in the detailed description. This summary is not intended to identify key factors or essential features of the claimed subject matter, nor is it intended to be used to limit the scope of the claimed subject matter.

According to one embodiment of the present disclosure, there is provided a method for training machine learning model. According to the method, a training data is received by one or more processing units. The machine learning model is trained based on the training data, wherein the training comprising: optimizing the machine learning model based on stochastic gradient descent (SGD) by adding a dynamic noise to a gradient of a model parameter of the machine learning model calculated by the SGD.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
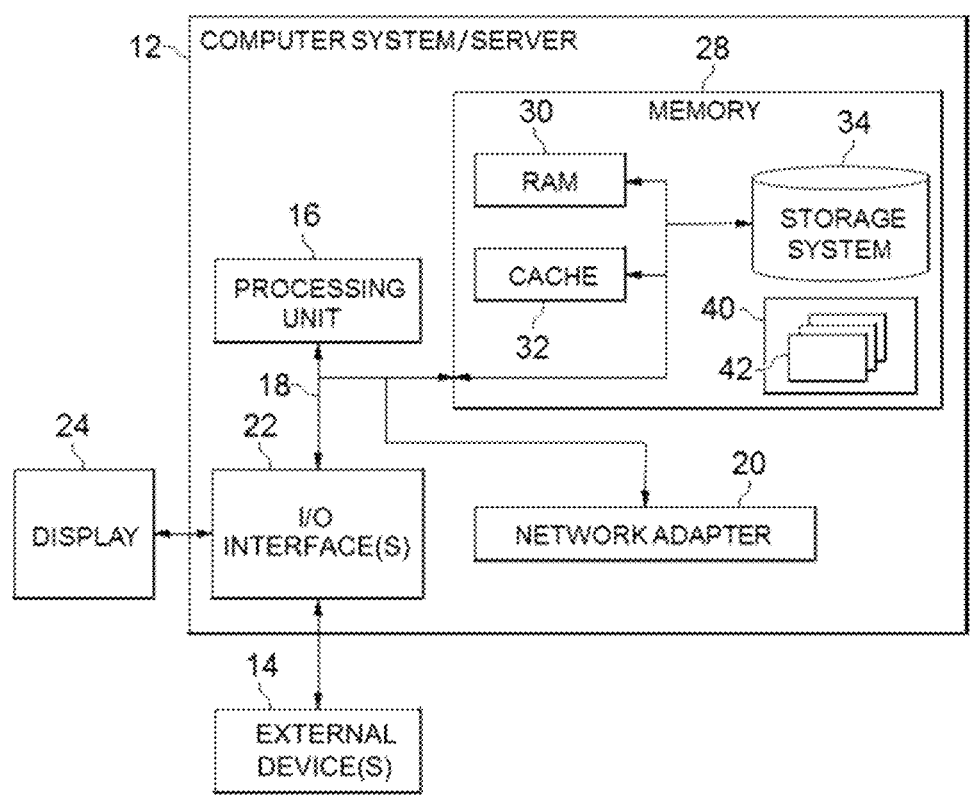
FIG. 1 depicts a cloud computing node according to an embodiment of the present invention.

Some preferable embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
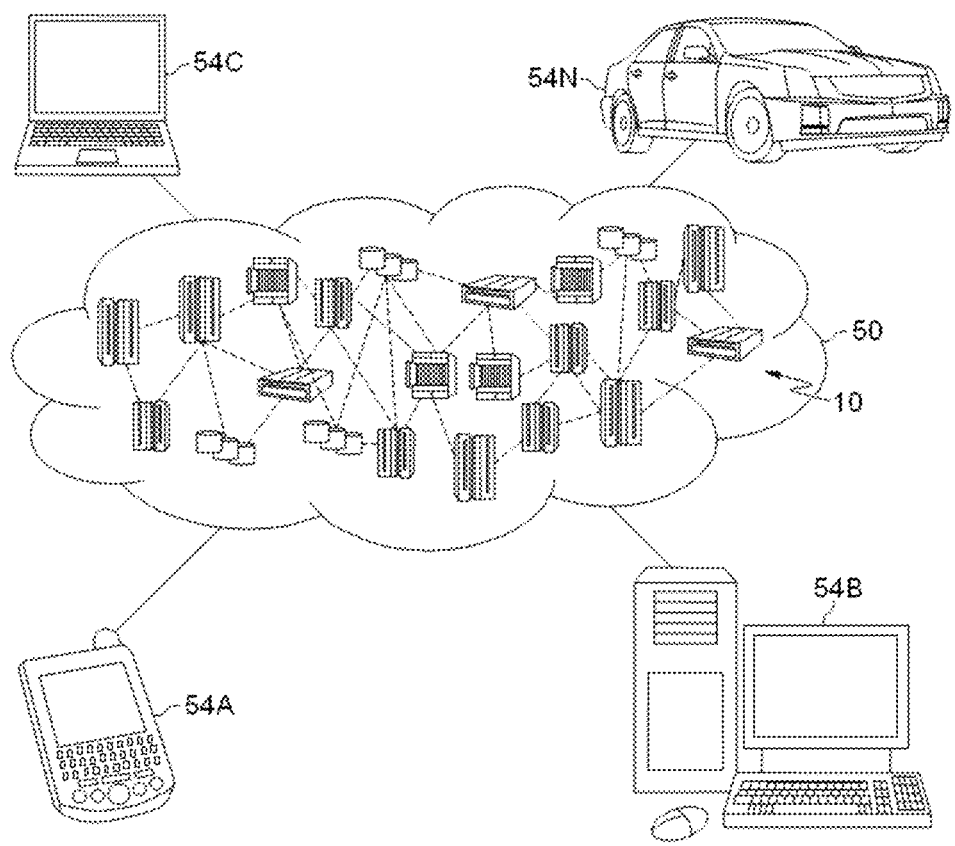
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
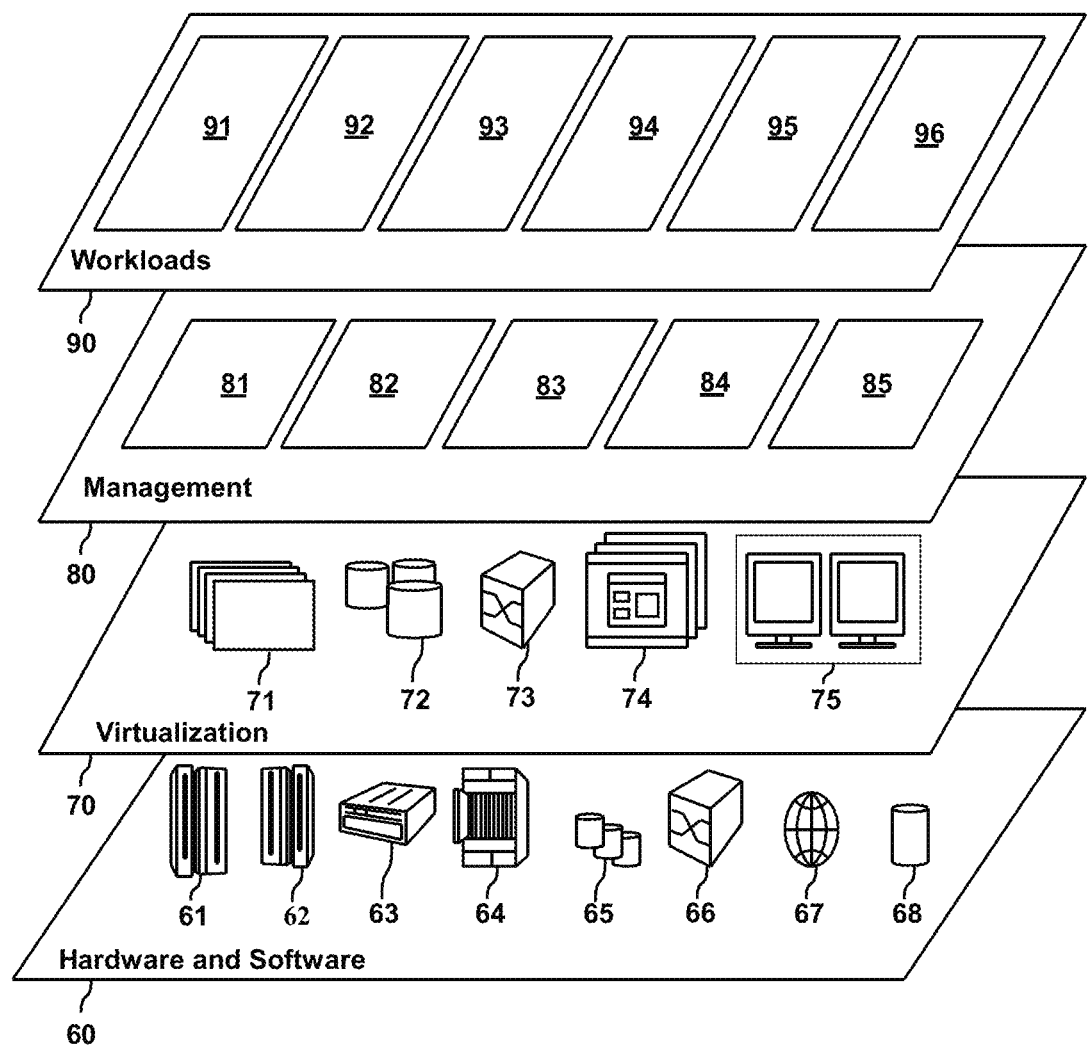
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and machine learning model training 96.

As discussed in the background part, one challenge in the model training is how to protect the privacy of the training data. The present disclosure will provide a method to solve this problem by dynamic adding a noise during the training process.

Figures 4, 5:
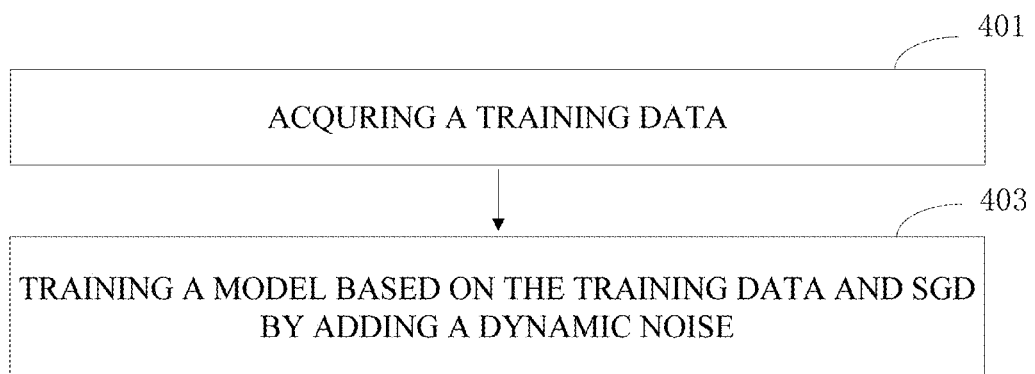
FIG. 4 shows a method for training machine learning model according to an embodiment of the present invention.
FIG. 5 shows a comparison between dynamic strategy and fixed strategy according to an embodiment of the present invention.

Now referring to FIG. 4, which shows a method for training a machine learning model according to one embodiment of the present invention. At block 401, a training data is acquired by one or more processing units. Usually, the training data is labeled. The training data may be from any field needing data insight. Particularly, the training data may be selected from the group consisting of: pathological data; autopilot data; medical experimental data; biological data; internet of things (IoT) data; social network data; e-commerce data. Those skilled in the art may can train any kind of machine learning model for usage. According to one embodiment of the present invention, the machine learning model may be a convolutional neural networks (CNN) or a recurrent neural network (RNN).

At block 403 of FIG. 4, the machine learning model can be trained based on the training data, by one or more processing units. Usually, the model parameters of the machine learning model can be initialized randomly, and then the training data may be inputted into the initialized machine learning model to optimizing the model parameters. Finally the machine learning model optimized may be output and be used in the field which the training data belongs to. As described above, the machine learning model optimized may cause privacy leakage. In order to overcome the challenge of privacy leakage, during the training, the machine learning model can be optimized based on stochastic gradient descent (SGD)(algorithms) by adding a dynamic noise to a gradient of a model parameter of the machine learning model calculated by the SGD, wherein SGD is a well-known iterative method for optimizing a differentiable objective function. According to one embodiment of the present invention, the optimizing may comprise minimizing the loss function of the machine learning model. According to one embodiment of the present invention, the added dynamic noise is selected from a predefined noise set. According to one embodiment of the present invention, a corresponding probability is assigned to each of the noises according to the loss function, wherein each of the noises is with a different scale from each other. According to one embodiment of the present invention, the added dynamic noise is selected based on the probability assigned. And according to one embodiment of the present invention, the noise is a Gaussian noise.

For a better understanding of the present invention, embodiments of the present invention will be described in the following paragraphs based on the training data being labeled pathological images. And the machine learning model may be a CNN according to an embodiment of the present invention. Although labeled pathological images and CNN are used to explain the machine learning model training processes, it should be clear to those skilled in the art that the following description is merely for the purpose of simplifying illustration and will not adversely limit the scope of the disclosure. Those skilled in the art can leverage the present disclosure for any kind of machine learning model training based on any kind of proper training data.

As described above, the standard SGD may be used to optimizing training a CNN. The goal of the training is to train a CNN model $\mathbb{M}:\hat{y}=f(x;\theta)$, where x is the labeled training data, $\hat{y}$ is the predicted label, and θ is the model parameters. Training of the model is to minimize the loss $\mathcal{L}$($\mathcal{D}$;θ)(function), wherein $\mathcal{D}$ is the labeled training data. In practice, the gradient of the loss may be estimated on a mini-batch, and the loss over a mini-batch may be denoted as:

$$\mathcal{L}(\mathcal{B}_t;\theta) = \frac{1}{|\mathcal{B}_t|}\sum_{(x,y)\in\mathcal{B}_t} 1(f(x;\theta), y) \quad (1)$$

Wherein l(f(x;θ),y) is the loss function, e.g., cross-entropy loss, and y is the ground-truth label. $B_t$ refers to a mini-batch of images which are randomly and independently drawn from the whole image set $\mathcal{D}$ of the training data, wherein t is the index of batches. Note that an additional regularization can be added into Equation (1), such as l2 term. At the t-th step of the SGD algorithm, we can update the current parameter $\theta_t$ as $\theta_{t+1}=\theta_t-\gamma_t \cdot \nabla_{\theta_t}\mathcal{L}(\mathcal{B}_t;\theta_t)$. Wherein $\gamma_t$ is the learning rate, the $\nabla_{\theta_t}\mathcal{L}(\mathcal{B}_t;\theta_t)$ is the gradient.

Based on the SGD described above, according to one embodiment of the present invention, a novel SGD practical solution name patient privacy preserving SGD(P3SGD) is proposed to alleviate the privacy leakage in a task of pathological image classification. The P3SGD, which injects the dynamic noise into the gradient to obtain a degree of differential privacy and reduce overfitting at the same time. It is worth noting that a pathological database usually consists of a number of patients, each of whom is further associated with a number of image patches. The P3SGD can protect the privacy in the patient level instead of image level as in most of the previous works. To achieve this goal, it is proposed to calculate the update of the parameters of the model upon the training data and add carefully-calibrated Gaussian noise to the gradient of a model parameter of the machine learning model calculated by the SGD, and the update can be calculated based on the gradient added with the carefully-calibrated Gaussian noise for both privacy protection and model optimization. In other words, an elaborated strategy is proposed to adaptively control the magnitude of the update of the parameters of the model. The details of the P3SGD will be further described in the following paragraphs according to one embodiment of the present invention. It should be clear that the following description is merely for the purpose of simplifying illustration and will not adversely limit the scope of the invention.

Before introducing the P3SGD in details, the definition "differential privacy" to be used may be explained. A randomized algorithm $\mathcal{A}$:D→R satisfies (∈,δ) (differential privacy) if for any two adjacent databases $\mathcal{D}$', $\mathcal{D}$"⊆D and for any subset of outputs S⊆R, they satisfy the following formula:

$$Pr[\mathcal{A}(\mathcal{D}') \in S] \le e^\epsilon Pr[\mathcal{A}(\mathcal{D}'') \in S] + \delta \quad (2)$$

wherein $\mathcal{A}$ is the algorithm used to train CNNs, e.g., the SGD algorithm. D denotes the training data and R is the parameter space of the CNN. ∈ is the privacy cost, δ is the probability of breaking the differential privacy. Intuitively, the formula 2 indicates that participation of one of the training data in a training phase has a negligible effect on the final weight parameters.

The P3SGD injects well-designed Gaussian noise into each step's update of the parameters of the model. The pseudo-code is depicted in Algorithm 1 and 2 as below to explain the P3SGD in details.

---
Algorithm 1 P3SGD

1: Inputs:
2:   Patient database: $\mathcal{D}$, Empirical Loss: $\mathcal{L}$.
3:   Patient sampling ratio: p.
4:   Noise scale set $\Omega_z$: $\{z_i\}_{i=1}^{N_o}$.
5:   Noise budget ∈' for selecting update per iteration.
6:   Bound of update's norm: $C_u$.
7:   Bound of objective function's norm: $C_o$.
8:   Initialize $\theta_0$ randomly
9:   for t ∈ [$\mathcal{T}$] do
10:      Take a subset $\mathcal{B}_t$ of patients with sampling ration p
11:      for each patient i ∈ $\mathcal{B}_t$ do
12:         $\Delta_t^i \leftarrow$ PatientUpdate(i, $\theta_t$)
13:      $\Delta_t \leftarrow \frac{1}{|\mathcal{B}_t|}\left(\sum_i \Delta_t^i\right)$
14:      $\Omega_\sigma = \{\sigma = zC/|\mathcal{B}_t|: \text{for z in } \Omega_z\}$
15:      $\Omega_\Delta = \{\tilde{\Delta} = \Delta_t + \mathcal{N}(0, (\sigma^2 I)): \text{for } \sigma \text{ in } \Omega_\sigma\}$
16:      $\tilde{\Delta}_t \leftarrow$ NoisyUpdateSelect($\Omega_\Delta$, ∈', $\mathcal{B}_t$, $\theta_t$, $\mathcal{L}$)
17:      $\theta_{t+1} = \theta_t + \tilde{\Delta}_t$
18:   function PATIENTUPDATE(i, $\theta_j$)
19:      θ ← $\theta_j$
20:      for batch image samples b from Patient i do
21:         $\theta \leftarrow \theta - \gamma \nabla \mathcal{L}(b; \theta)$
22:      $\Delta^i = \theta - \theta_j$
23:      $\Delta^i = $ ClipNorm($\Delta^i$, $C_u$)
24:      return $\Delta^i$
---

Wherein $\theta_0$ is the initial model parameters, $N_z$ is the number of pre-defined noise scales, T is the total number of batches, i is the patient index, $z_i$ is the element of the noise scale set, $\Delta_t^i$ is the update of the parameters of the model for the patient i of the batch t, $\Delta_t$ is the averaged update of the parameters of the model of the batch t, $\Omega_\sigma$ is the set of variances, σ is the variance of the Gaussian distribution, $\Omega_\Delta$ is the set of updates, $\tilde{\Delta}$ is the update of the parameters of the model with noise, $\mathcal{N}(0,(\sigma^2 I))$ is the Gaussian distribution, $\tilde{\Delta}_t$ is the selected update of the parameters of the model by sampling, ∈' is the privacy budget used for selecting the update of the parameters of the model in each iteration, $\Delta^i$ is the update of the parameters of the model for the patient i, ClipNorm($\Delta^i, C_u$) is used to bound the update of the parameters of the model by $C_u$. Wherein at the beginning of the t-th step of P3SGD, a patient batch $B_t$ can be randomly sampled from the database D with a sampling ratio p. Here, the notation $B_t$ is different from the one in Equation (1), where the $B_t$ is sampled from individual images instead of patients.

| Algorithm 2 NoisyUpdateSelect |
|---|
| 1:     function NOISYUPDATESELECT($\Omega, \epsilon, B, \theta, \mathcal{L}$) |
| 2:     $\Omega_u = \{u = -\text{Clip}(\mathcal{L}(B; \theta + \Delta), C_o): \text{for } \Delta \text{ in } \Omega\}$ |
| 3:     Select $\Delta$ with probability $\dfrac{\exp\left(\dfrac{\epsilon u}{2C_o}\right)}{\sum_{u \in \Omega_u} \exp\left(\dfrac{\epsilon u}{2C_o}\right)}$ |
| 4:     return $\Delta$ |

Wherein $-\text{Clip}(\mathcal{A}(B; \theta+\Delta), C_o)$ is used to bound the empirical loss by $C_o$, u is the negative of the clipped empirical loss, $\Omega_u$ is the set of the losses, $C_o$ is the bound of the loss, and $\Delta$ is the selected update of the parameters of the model.

Then, for each patient i in the sampled batch, a back propagation can be performed to calculate gradients of the parameters via images of the patient i. After that, the model can be locally updated using the computed gradients. After all images of this patient are traversed, the model updated with respect to patient i can be obtained. This procedure can be interpreted as performing SGD on the local data from patient i.

In the next step, the updates of all patients in $B_t$ are averaged to obtain the final update at the t-th step. It should be noted that the sensitivity of the total update of the parameters of the model need to be controlled. According to one embodiment of the present invention, this is implemented by clipping the $l_2$ norm of the update of the parameters of the model, with respect to each individual patient (as shown in line 23 in Algorithm 1). $C_u$ in Algorithm 1 denotes a predefined upper-bound. Thus, the sensitivity of the total update of the parameters of the model can be bounded by $2C_u$. The main idea of update of the parameters of the model computation is implemented by a function PATIENTUPDATE, as shown in Algorithm 1.

To protect privacy, Gaussian mechanism is used to inject well-calibrated Gaussian noise into the original update of the parameters of the model. The variance of injected Gaussian noise is jointly determined by the upper bound $C_u$ of the l2 norm of the update of the parameters of the model and the noise scale z. In one embodiment of the present invention, a common strategy to set $C_u$ as a globally fixed value. Therefore, the choice of a noise scale z is important to train CNN model with good performance. According to many experiments, using a fixed noise scale throughout the training phase may lead to the departure of the update of the parameters of the model from the descent direction or an ignorable regularization effect, because the magnitudes of the update of the parameters of the model may vary at different iterative steps. Thus the strategy that uses a fixed noise scale may hinder the classification performance.

According to one embodiment of the present invention, an elaborated strategy can be used to select the scale of the dynamic noise, wherein the negative loss function can be used as the objective function, and the argument is the update of the parameters of the model built upon different noise scales from the predefined set Q. This strategy is implemented as the function NoisyUpdateSelect depicted in Algorithm 2 above. The predefined set $\Omega_z$ contains $N_z$ noise scale factors. Increasing $N_z$ leads to more subtle control of the update of the parameters of the model, which further boosts the performance. However, the increase of $N_z$ also results in an increase of computational cost. Precisely, one more noise scale will bring about one more forward computation on all images in $B_t$. According to one embodiment of the present invention, the setting $N_z=2$ can be good enough. In the experiments, this strategy is crucial to boost the performance of the model.

In this and following paragraphs, the exemplary results of embodiments of the present invention will be introduced. The training data is collected by doctors. The training data consists of 1,216 patients and each patient contains around 50 image patches. According to one embodiment of the present invention, the task of the experiment is glomerulus classification, which aims to classify whether an image patch contains a glomerulus or not. The image patches are manually labelled by the doctors.

The P3SGD can provide patient-level privacy within differential privacy. The differentially private degree is measured by ($\epsilon, \delta$) (i.e., differential privacy) in formula 2. The target $\delta$ is fixed to $$\frac{1}{|N_p|^{1.1}}$$

($N_P$ is the number of patients in the training data), the $\delta$ is around 5e−4 ($N_P$=1,000). To verify the effectiveness of P3SGD for dynamically controlling the noisy update, the P3SGD (marked by ✓ in FIG. 5) will be compared with the strategy of fixed noise scale (marked by x in FIG. 5). For simplicity, dynamic and fixed are used to denote these two strategies in FIG. 5. All the experiments are performed on ResNet-18 (ResNet-18 is a well-known convolutional neural network).

In FIG. 5, various noise scale sets $\Omega_z$ are tested to show how the scale of the dynamic noise affects the performance. It is found that the scale of the dynamic noise greater than 3.0 may leads to unstable training sometime. According to one embodiment of the present invention, $\Omega_z$ may be built by using the noise scale from {1.0, 2.0, 3.0}. Overall, P3SGD with the dynamic strategy ($\Omega_z$={3.0, 1.0}) achieves the best testing accuracy of 95.23% at a privacy cost of 6.97 as shown in FIG. 5. For the fixed strategy, a larger noise scale leads to a lower privacy cost, however, it may cause the noisy update deviating from the decent direction and further hinders the testing accuracy. For example, setting $\Omega_z$ to {3.0} leads to the lowest privacy cost of 4.70 and the worst accuracy of 92.15%, while setting $\Omega_z$={1.0} achieves a better accuracy of 94.38% but a much higher privacy cost of 8.48. The dynamic strategy provides a reasonable solution for this dilemma of the fixed strategy.

Figure 6:
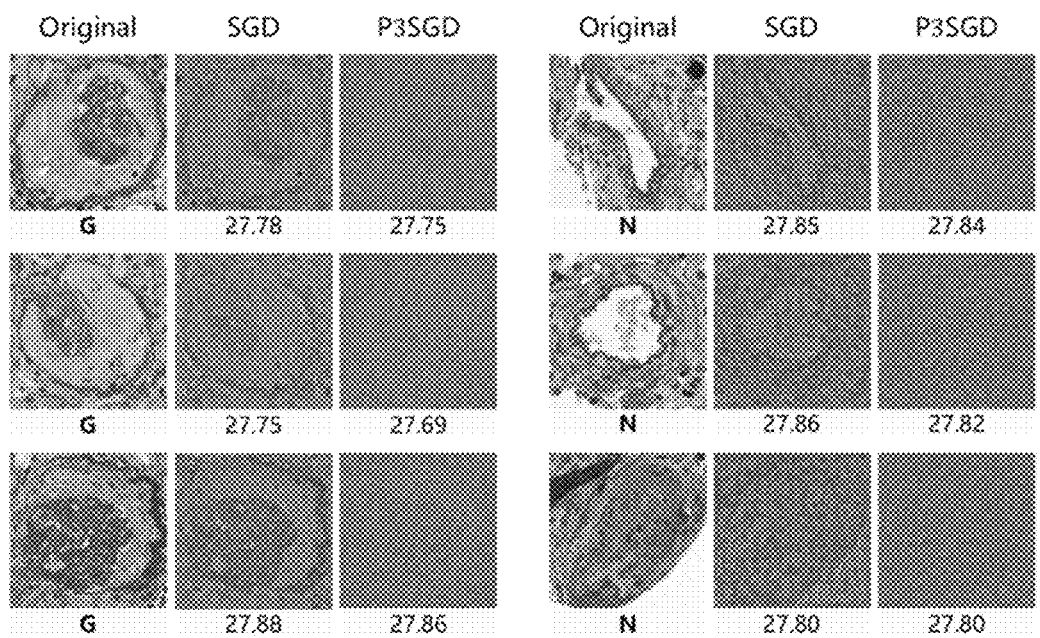
FIG. 6 shows a visualization of the model inversion attack for CNN models trained based on SGD/P3SGD according to an embodiment of the present invention.

Now referring to FIG. 6, which shows the visualization of the model inversion attack for CNN models trained based on SGD/P3SGD, wherein G/N below each original patch denotes if the patch contains a glomerulus or not. According to one embodiment of the present invention, the attacking method is adopted from "A. Mahendran and A. Vedaldi. Understanding deep image representations by inverting them. In CVPR, 2015.". According to one embodiment of the present invention, experiments are conducted on the ResNet-18 and the feature maps of the model are used from the 3-th residual block to reconstruct the input images. As shown in FIG. 6, the outline of the tissue in the input images can be reconstructed by using the features from the SGD. In contrast, no valuable information can be obtained from the P3SGD (i.e., the model is oblivious to training data). It indicates that SGD is more vulnerable than P3SGD. The number below each reconstructed image is the peak signal-to-noise ratio (PSNR) value in FIG. 6. Quantitatively, the attack is performed on all the training images and the average PSNR values are reported as: 27.82 for P3SGD and 27.84 for SGD.

It should be pointed out that in the above embodiments of the present invention are described with pathological data, however, it is only for a better understanding of the present invention thus will not adversely limit the scope of the invention. For example, those skilled in the art could leverage the methods of this invention to any suitable data, such as the data selected from the group: autopilot data; medical experimental data; biological data; internet of things (IoT) data; social network data; e-commerce data etc., it will not be discussed in detail for the purpose of simplifying illustration.

It should be noted that the method for training machine learning model according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter condition, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for training a machine learning model, comprising:
   acquiring, by one or more processing units, a training data; and
   training, by one or more processing units, the machine learning model based on the training data, the training comprising:
   optimizing, by one or more processing units, the machine learning model based on stochastic gradient descent (SGD), and
   minimizing privacy leakage by adding a dynamic noise to a gradient of a model parameter of the machine learning model calculated by the SGD.

2. The method of claim 1, wherein the machine learning model is a convolutional neural networks (CNN) or a recurrent neural network (RNN).

3. The method of claim 1, wherein the training data is selected from the group consisting of: pathological data; autopilot data; medical experimental data; biological data; internet of things (IoT) data; social network data; e-commerce data.

4. The method of claim 1, wherein the optimizing further comprises minimizing a loss function of the machine learning model.

5. The method of claim 4, wherein the added dynamic noise is selected from a predefined noise set.

6. The method of claim 5, further comprising assigning a corresponding probability to each of the noises according to the loss function, wherein each of the noises is with a different scale from each other.

7. The method of claim 6, wherein the added dynamic noise is selected based on the probability assigned.

8. The method of claim 5, wherein the machine learning model is a CNN, and the predefined noise set comprises noises with three different scales and the training data are labeled pathological images.

9. The method of claim 1, wherein the noise is a Gaussian noise.

10. A computer system, comprising: a processor;
    a non-transitory computer-readable memory coupled to the processor, the memory comprising instructions that when executed by the processor perform actions of:
    acquiring, by one or more processing units, a training data; and
    training, by one or more processing units, the machine learning model based on the training data, the training comprising:
    optimizing, by one or more processing units, the machine learning model based on stochastic gradient descent (SGD), and
    minimizing privacy leakage by adding a dynamic noise to a gradient of a model parameter of the machine learning model calculated by the SGD.

11. The system of claim 10, wherein the machine learning model is a convolutional neural networks (CNN) or a recurrent neural network (RNN).

12. The system of claim 10, wherein the training data is selected from the group consisting of: pathological data; autopilot data; medical experimental data; biological data; internet of things (IoT) data; social network data; e-commerce data.

13. The system of claim 10, wherein the optimizing further comprises minimizing a loss function of the machine learning model.

14. The system of claim 13, wherein the added dynamic noise is selected from a predefined noise set.

15. The system of claim 14, further comprising assigning a corresponding probability to each of the noises according to the loss function, wherein each of the noises is with a different scale from each other.

16. The system of claim 15, wherein the added dynamic noise is selected based on the probability assigned.

17. The system of claim 14, wherein the machine learning model is a CNN, and the predefined noise set comprises noises with three different scales and the training data are labeled pathological images.

18. The system of claim 10, wherein the noise is a Gaussian noise.

19. A computer program product for training a machine learning model, comprising a non-transitory computer readable storage medium having program instructions embodied therewith, the program instructions executable by a processor to cause the processor to:
    acquiring, by one or more processing units, a training data;
    training, by one or more processing units, the machine learning model based on the training data, the training comprising:
    optimizing, by one or more processing units, the machine learning model based on stochastic gradient descent (SGD) by adding a dynamic noise, selected from a predefined noise set, to a gradient of a model parameter of the machine learning model calculated by the SGD wherein the optimizing further comprises minimizing a loss function of the machine learning model, and assigning a corresponding probability to each of the noises in the predefined noise set according to the loss function, wherein each of the noises is with a different scale from each other.

20. The computer program product of claim 19, wherein the training data is selected from the group consisting of: pathological data; autopilot data; medical experimental data; biological data; internet of things (IoT) data; social network data; e-commerce data.

\* \* \* \* \*